April 4, 1967 A. A. BERNSTEIN 3,312,413

AUTOMATIC TAPE THREADER

Filed June 17, 1965

INVENTOR
ALBERT A. BERNSTEIN
BY HIS ATTORNEY
Putnam Frank

United States Patent Office 3,312,413

Patented Apr. 4, 1967

3,312,413
AUTOMATIC TAPE THREADER

Albert A. Bernstein, 49 Cranberry St., Brooklyn, N.Y. 11201

Filed June 17, 1965, Ser. No. 464,600
3 Claims. (Cl. 242—74.2)

This invention relates to an automatic threading means and more particularly to a device for threading the tape into a reel.

Heretofore persons attempting to thread a tape into a take-up reel of a tape recorder have had great difficulty because the average person's fingers are too large to manipulate the tape into its proper position. Once the tape has been put in position, often times the tape is pulled from the receiving slot in the take-up reel because the tape is not properly held in position and the pull exerted on the threaded tape unseats the tape from the slot thereby requiring a rethreading of the tape. Further it has been found that the tape may tear because of this condition.

It is the general object of the present invention to avoid and overcome the objections to prior art practices by the provision of a sturdy and inexpensive automatic tape threader.

Another object of the present invention is to provide an automatic tape threader which will permit quick and easy threading of tape in a tape recorder or the like.

A further object of the present invention is to provide a tape threader device which will hold the tape firmly in position on the take-up reel.

Yet another object of the present invention is to provide a tape threading device which may be used to insert or remove the end of the tape from the reel quickly.

Other objects, which will become apparent as the description proceeds, are achieved by providing a tape threading device for applying tape to a reel comprising a resilient body member having an opening. At the opening there is provided a pair of members which protrude radially outwardly from the opening, the body member being substantially wider such that when placed in the reel the body will extend above the surface of the reel.

Figure 1:
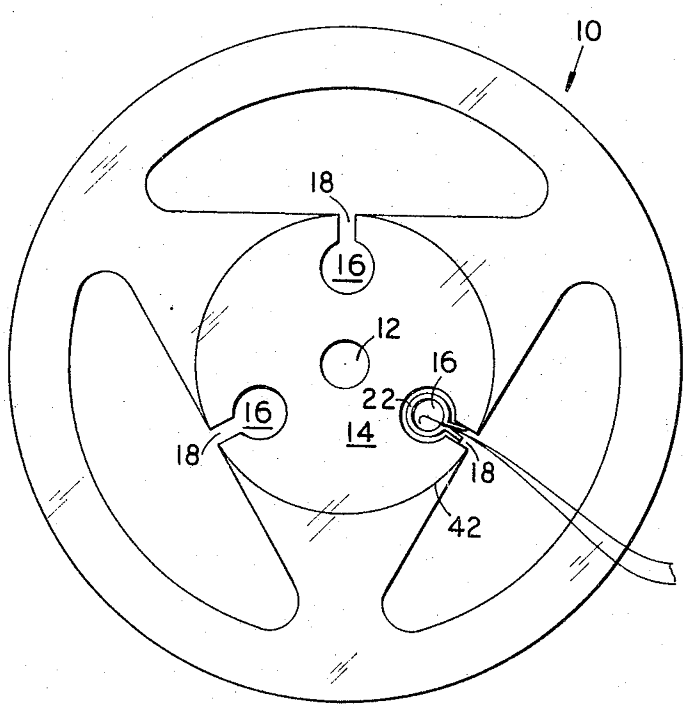
Figure 3:
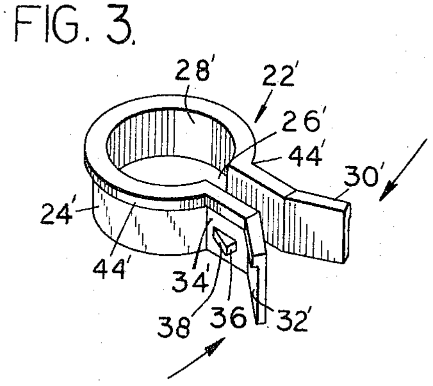
Figure 2:
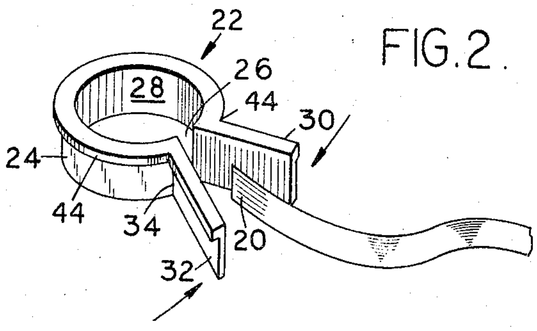

For a better understanding of the present invention reference should be had to the accompanying drawings wherein like numerals of reference indicate similar parts throughout the several views and wherein:

FIGURE 1 is a plan view of a reel showing the application of the present invention, FIGURE 2 is a perspective view of the present invention, and FIGURE 3 is a perspective view of the present invention showing a modification of the invention shown in FIGURE 2.

Although the principles of the present invention are broadly applicable to the threading of tape into reels the present invention is particularly adapted for use in conjunction to tape recorders and hence it has been illustrated and will hereinafter be described.

A conventional take-up reel used with tape recorders shown in FIGURE 1, is indicated generally by the reference numeral 10.

The take-up reel 10 may be any conventional reel presently available on the market, however for simplicity the take-up reel 10 shown in FIGURE 1 is provided with a spindle receiving hole 12 in its center 14 to receive a driving spindle (not shown). The center 14 of the take-up reel 10 is conventionally provided with a plurality of angularly spaced openings 16 which may be used for purposes not relevant to the present invention. However, one of such openings is provided with a slot 18 for receiving a tape end 20.

In order to thread the tape end 20 through the slot 18 and into the opening 16, an automatic tape threader 22 is provided. Structurally the tape threader 22 is made of a resilient or flexible material such as spring steel or resilient plastic or the like and may be provided with a generally cylindrically shaped body portion 24. It should be noted that although the tape threader 22 shown in FIGURE 2 is provided with a generally cylindrically shaped body portion 24, the body portion 24 may take other shapes depending upon the overall shape of the opening 16, as shown in FIGURE 3. The body portion 24 may be provided with a tape receiving slot 26 in its wall 28 through which the tape end 20 may be fed.

In order to provide for the closing or opening of the tape receiving slot 26, a first lip 30 and a second lip 32, which protrude radially outwardly from the body portion 24, are provided. At the junction of the body portion 24 and the first and second lips 30, 32 there is formed a neck portion 34 around the tape receiving slot 26. The tape receiving slot 26 is normally open, however, when pressure is applied to the lips 30, 32 (as shown by the arrows in FIGURE 2) the tape receiving slot 26 may be forced closed thereby gripping a tape end 20 which may have been inserted into the body portion 24 of the tape threader 22.

As shown in FIGURE 1, the slot 18 is formed in the take-up reel 10 at one of the openings 16, is rather narrow. The standard procedure was formerly to thread the tape end 20 through the slot 18 and thrust that when the take-up reel 10 and started to turn that end would be caught in the slot 18 and the tape would then wind onto the take-up reel 10. Without disturbing this standard construction, of the take-up reel 10, a tape end 20 may be inserted into the automatic tape threader 22 through the tape receiving slot 26. With the tape end 20 inserted into the body portion 24 of the tape threader 22, the first and second lips 30, 32 are pressed toward each other (by the thumb and forefinger of one hand) so that the tape end 20 is gripped by the closed tape receiving slot 26. The automatic tape threader 22 may then be inserted into the opening 16 such that the neck portion 34 is inserted into the slot 18 with the body portion situated in the opening 16. Since the slot 18 is narrow the neck portion 34 of the tape threader 22 will remain in its squeezed condition because the narrowness of the slot 18 will not permit the resilient body portion to expand and will not permit the first and second lips 30, 32 to separate from their "squeezed together" condition. In this manner the tape end 20 is quickly inserted into the opening 16 in the take-up reel 10 and the tape end 20 is further held in a fixed position so that it will not loosen when the take-up reel 10 begins to turn. As may be seen in FIGURE 1 the outer edges 40 of the lips 30, 32 are approximately flush with the core 42 on which the tape is wound on the take-up reel 10. This structure is provided so that the automatic tape threader 22 will in no way interfere with the winding of the tape on the take-up reel 10.

In order to facilitate the quick removal of the tape threader 22 from the opening 16, the tape threader 22 may be constructed such that it is wider than the width of the take-up reel 10 so that when the tape threader 22 is inserted in the opening 16 it will protrude above the take-up reel 10. Further a rim 44 may be provided around the edge of the body portion 24 to aid in the removal of the tape threader from the opening 16. In this manner the tape threader 22 is easily accessible and can be removed from the opening by merely gripping the rim 44 around the body portion by the thumb and forefinger and lifting from the opening 16.

It may be seen that the shape of the body portion 24 of the automatic tape threader 22 may be varied in accordance with the opening 16 in the take-up reel 10.

FIGURE 2 shows only one form which may be used, however other shapes such as hexagonal, squares, and T shapes may also be found.

It will be recognized that alternatively a further locking means 36 may be provided at the neck portion 34′ of the automatic tape threader 22′ to insure that the tape end 20′ is locked in position when the take-up reel 10 begins to turn. The neck portion 34′ may be in an elongated form, as shown in FIGURE 3 and is provided with a ridge 38 which slopes upwardly toward the first and second lips 30′, 32′. On occasion the slot 18 in the take-up reel 10 becomes widened due to continued use and handling. If the slot 18 becomes too distorted, it will not provide the necessarily small opening to keep the lips 30′, 32′ closely pressed together. In this regard the ridges 38 act as a wedge such that when the automatic tape threader 22′ is placed in the opening 16 and the neck portion 34′ is disposed in the slot 18, the tape threader 22′ may be slid inwardly so that the inclined surfaces of the ridges 38 will ride against the edges of the slot 18 thereby forcing the lips 30′, 32′ to close together and forcing the tape receiving slot 26′ to close. In this manner the tape end 20 will be securely locked in place. It should be noted that a relatively small inward movement of the tape threader 22′ will affect the required locking feature.

It will be recognized by those skilled in the art that the objects of the present invention have been achieved by providing an automatic tape threader which will permit the quick and easy threading of the tape in a take-up reel of a tape recorder or film in a moving picture projector and further provide for its removal. Further, the automatic tape threader will provide a means for locking a tape end in a take-up reel thereby preventing its being thrust loose from the reel when the reel begins to turn.

While in accordance with the patent statutes a preferred and alternative embodiment of the present invention have been illustrated and described in detail, it is to be particularly understood that the invention is not limited thereto or thereby.

I claim:

1. An automatic tape threader for a take-up reel having a plurality of angularly spaced openings, one of said openings having a slot for receiving a tape end comprising body portion having a tape receiving slot, a pair of lips joined to said body portion and in communication with the edges of said tape receiving slot for closing said tape receiving slot, a neck portion formed at the junction of said body portion and said lips such that when a tape end is inserted in said body portion through said tape receiving slot said lips are pressed closed and the neck portion is inserted in the slot of said take-up reel with the body portion seated in said opening, and a ridge around said body portion allowing said automatic tape threader to be removed easily from said opening and said slot, said neck portion being maintained closed by the slot thereby threading said tape end in said take-up reel and fixing said tape end in position.

2. An automatic tape threader for a take-up reel having a plurality of angularly spaced openings, one of said openings having a slot for receiving a tape end comprising a body portion having a tape receiving slot, said body portion being wider than said take-up reel so that it protrudes above said take-up reel when inserted in said opening, a pair of lips joined to said body portion and in communication with the edges of said tape receiving slot for closing said tape receiving slot, a neck portion formed at the junction of said body portion and said lips such that when a tape end is inserted in said body portion through said tape receiving slot said lips are pressed closed and the neck portion is inserted in the slot of said take-up reel with the body portion seated in said opening, and a ridge around said body portion allowing said automatic tape threader to be removed easily from said opening and said slot, said neck portion being maintained closed by the slot thereby threading said tape end in said take-up reel and fixing said tape end in position, said automatic tape threader being removed from said opening and said slot by gripping said ridge and pulling upwardly.

3. An automatic tape threader for a tape-up reel having a slot for receiving a tape end comprising a body portion having a tape receiving slot, a pair of lips joined to said body portion and in communication with the edges of said tape receiving slot for closing said tape receiving slot an elongated neck portion formed at the junction of said body portion and said lips, and a locking means disposed on said elongated neck portion such that when a tape end is inserted in said body portion through said tape receiving slot said lips are pressed closed and the elongated neck portion is inserted in the slot of said take-up reel, said locking means cooperating with said slot to maintain said tape receiving slot closed thereby threading said tape end in said take-up reel and fixing said tape end in position.

References Cited by the Examiner

UNITED STATES PATENTS

| | | | |
|---|---|---|---|
| 1,118,689 | 11/1914 | Sharlow | 242—74.2 |
| 2,891,737 | 6/1959 | Hasbrouck | 242—74.2 |

FRANK J. COHEN, *Primary Examiner.*

N. L. MINTZ, *Examiner.*